United States Patent [19]

Kollross et al.

[11] Patent Number: 4,625,362
[45] Date of Patent: Dec. 2, 1986

[54] METHOD AND A DEVICE FOR AUTOMATED MANUFACTURE OF STRINGS OF SAUSAGES

[75] Inventors: Günter Kollross; Fritz K. Steinbis, both of Gross Gerau-Dornheim, Fed. Rep. of Germany

[73] Assignee: Teepak, Inc., Oak Brook, Ill.

[21] Appl. No.: 584,252

[22] PCT Filed: Jun. 3, 1983

[86] PCT No.: PCT/DE83/00098
§ 371 Date: Feb. 2, 1984
§ 102(e) Date: Feb. 2, 1984

[87] PCT Pub. No.: WO83/04162
PCT Pub. Date: Dec. 8, 1983

[30] Foreign Application Priority Data

Jun. 25, 1982 [DE] Fed. Rep. of Germany ....... 3220640
Jun. 25, 1982 [DE] Fed. Rep. of Germany ........... 32725

[51] Int. Cl.⁴ .............................................. A22C 11/02
[52] U.S. Cl. ............................................. 17/33; 17/49; 53/55; 53/506; 53/576
[58] Field of Search ................. 17/33, 49, 1 R, 34, 17/35; 83/71, 63; 53/55, 506, 576, 122

[56] References Cited

U.S. PATENT DOCUMENTS

| | | | |
|---|---|---|---|
| 3,055,246 | 9/1962 | Steinberg | 83/74 |
| 3,112,516 | 12/1963 | Bonnee | 17/12 |
| 3,207,368 | 9/1965 | Runge | . |
| 3,527,128 | 9/1970 | Thumini | 83/71 |
| 3,538,726 | 11/1970 | Cook | 83/71 X |
| 3,594,855 | 7/1971 | Urbutis | 17/42 |
| 3,597,791 | 1/1971 | Marbach et al. | 17/49 |
| 3,618,788 | 11/1971 | Murray | 83/71 X |
| 3,916,598 | 11/1975 | Adams et al. | 53/55 |
| 4,017,941 | 3/1977 | Raudys et al. | 17/41 |

FOREIGN PATENT DOCUMENTS

| | | |
|---|---|---|
| 0013552 | 7/1980 | European Pat. Off. . |
| 0068578 | 1/1983 | European Pat. Off. . |
| 1187947 | 2/1965 | Fed. Rep. of Germany . |
| 2249070 | 4/1974 | Fed. Rep. of Germany . |
| 2941872 | 4/1981 | Fed. Rep. of Germany . |
| 1483818 | 3/1966 | France . |
| 2005807 | 12/1969 | France . |
| 2343427 | 7/1977 | France . |
| 7900232 | 7/1980 | Netherlands . |
| 442125 | 1/1968 | Switzerland . |
| 2087338 | 1/1982 | United Kingdom . |

Primary Examiner—Willie G. Abercrombie
Attorney, Agent, or Firm—William J. Crossetta; Michael L. Dunn

[57] ABSTRACT

A method and apparatus is disclosed for the continuous automated manufacture of sausage wherein tubular material for sausage casing from a supply source is axially shirred by shirring means into shirred sections, of continuously measured length; the shirred sections are stuffed with force meat into divided up and closed off portions with the amount of tubular material utilized being continually measured; and, the entire process is controlled and activated by sensing means, memory means, comparator means and means responsive to such sensing, memory and comparator means, to maximize utilization of shirred casing and to avoid stuffing into a void.

41 Claims, 2 Drawing Figures

METHOD AND A DEVICE FOR AUTOMATED MANUFACTURE OF STRINGS OF SAUSAGES

DESCRIPTION

The present invention is concerned with a method for automated manufacture of strings of sausages on a sausage stuffing machine, using hose material for the sausage casings that is first withdrawn from a supply roll, next to the stuffing machine, in extended lengths by the section, axially shirred and separated off whereafter each of such section, individually, is placed ahead of the force-meat ejector of the stuffing machine, stuffed there, by the portion, with force-meat while withdrawn in fractionated flow from a filling tube, divided off and closed off, and with a device for implementing such a method.

A method of the above-described type has been taught by DE-OS No. 29 41 872. The state-of-the-art method over the "classical" method of obtaining ready-to-use shirred hose lengths—so called "tubular corrugations"—from tube manufacturers, involves a number of considerable advantages beneficial to the sausage manufacturer, viz:

the tubular material wound in extended lengths on rolls, for the storage thereof, takes considerably less space than tubular corrugations shirred ready-for-use;

the tubular material remained unwatered until supplied to the sausage manufacturer, in any case is sterile and may be stored in dry rooms even over extended periods of time with no risk of bacterial contamination;

watering of the tubular material for obtaining the moisture content required for shirring and stuffng, in unshirred material, takes place considerably more rapidly than with densely shirred tubular corrugations and, for this reason, can also be performed in continuous flow;

removal of the tubular envelopes or nettings for packing the individual tubular corrugations that, substantially, can be performed only manually, is eliminated;

placement of the corrugations shirred only immediately prior to stuffing, ahead of the force-meat ejector of the stuffing machine, may be mechanized thereby saving additional labor and avoiding the risk of damage to the tubular material when manually supplied to the filling tubes;

as here, too, shirring can be carried out mechanically, the "shir-stuff-clip" method as a whole can be automated and streamlined.

Nevertheless, an operator cannot be completely foregone in the prior known process. Unavoidable tolerances in the dimensions and the stretchability of the tubular material and tolerances in the shirred section lengths will require a permanent water of the material withdrawal on the filling tube and the timely manual switch off of the stuffing machine unless major unfilled residual lengths of tubular material for avoiding "stuffing into vacuity" and the disastrous consequences thereof are to be put up with.

It is the object of the invention to avoid that disadvantage and to improve the process of the afore-mentioned type to the effect that a completely automatic operation with no manual manipulation will be possible under an utmost exploitation of the tubular lengths shirred by the section.

That problem, in accordance with the invention, is solved in that the length of each shirred tubular section during withdrawal from the supply roll is measured in known per se manner, that, moreover, the length of the tubular material withdrawn from the filling tube is continually measured and compared with the section length previously measured during shirring, and that filling, dividing off and closing off is discontinued in response to that comparison.

Measuring of the material length in each shirred tubular section also in shirring direction prior to stuffing is already known in the art (German Patent Application No. P 31 34 698.7-27). However, in the prior state of art, such a measurement is carried out only for the purpose of controlling the shirring operation as such only with a view to the tubular length to be shirred, whereas, in the invention, the result of such measurement is constantly resorted to as a reference quantity in the later processing of the previously measured tubular sections on the stuffing machine thereby safeguarding an utmost utilization of the tubular material involved with a minimum of waste, with the measurement of the tube withdrawal from the stuffing tube ahead of the braking point where the material is not yet subjected to the internal pressure exerted by the stuffed-in force-meat, excluding falsifications of the comparison between the length measurements owing to a material stretch during stuffing.

In a preferred embodiment of the invention, the tubular length withdrawn during shirring from the supply roll is continually compared with a predetermined section length which at least approximately is so determined as to correspond to a fixed numbered multiple of the tubular length required for a predetermined stuffing portion in a given tube caliber. That measure not only is additionally beneficial to the high degree of exploitation of the tubular material as striven for but equally facilitates the changeover when switching to other stuffing quantities.

It is especially in small-sized sausages, such as boiling sausages or the like, that should all be of the same net weight, that the process of the invention, with advantage, can be so carried out, that stuffing, constricting, (dividing off) and closing off will be interrupted if the comparison between the tubular material withdrawn from the stuffing tube and the length of the shirred tube section shows that the residual material available on the stuffing tube is not sufficient for stuffing again the predetermined amount.

The residual lengths of unfilled tube material possibly left over in this way of procedure in any case will be so irrelevant and negligible that, based on the overall length of each tube section, they can be put up with.

In large-sized sausages used especially for cuts, it will, however, be more beneficial, in accordance with another form of embodiment of the invention, to so carry out the process as to reduce the stuffing quantity in the last filling operation of each tube section in accordance with the residual length of the tubular material on the stuffing tube arising out of the comparison. The so reduced last sausage of each tube section may then, if need be, be sold at a lower price or used by the sausage manufacturer himself for cuts.

A special advantage of the process according to the invention resides in that the tubular length to be shirred per tube section is not required to be a predetermined one. The process of the invention, in accordance with a preferred embodiment can be so carried out that the predetermined section length for the shirring is constantly corrected by continually measuring the tubular length factually required with the predetermined stuffing quantity of a sausage as a result of caliber fluctuations and/or stretchability changes in the tube material.

Moreover, the invention also permits an automatic watch of sealing joints in the tube material which will have to be sorted out not only for optical reasons but also on account of their reduced strength over the filling pressure which, hitherto, has equally required a visual check on the part of an operator. That problem, according to a special feature of the invention, is solved in that the tube material withdrawn from the supply roll is continually watched for occurrence of a sealing joint and that the shirring operation is automatically terminated and the shirred tubular section separated off and placed ahead of the force-meat ejector of the stuffing machine before the sealing joint is passed into the shirring range. The shorter material length in the tubular section shirred, formed upon occurrence of a sealing joint, thanks to the process of the invention is automatically taken into consideration during stuffing and here, too, will discontinue in due time the stuffing, dividing-off and closing-off operations.

In the event that a sealing joint occurs it will not be necessary for the process sequence to be discontinued. The process can be so carried out that withdrawing and shirring of the tube material from the supply roll, after placement of the tubular section separated off ahead of the sealing joint at the force-meat ejector of the stuffing machine, are automatically continued and that the shirring operation is again discontinued and the tube material again separated as soon as the sealing joint has passed the point of separation. The tubular section containing the sealing joint is sorted out and the process is normally continued with the tube material to follow.

Sorting out the material section containing the sealing joint can be performed in various ways and, with conventional means, can readily be done automatically.

In order to avoid upon occurrence of the sealing joints especially in the production of longer-sized sausages, that at the end of a sausage string consisting of such sausages, an unstuffed tubular section of extended length will be left over or a sausage of reduced length will have to be stuffed, it is provided according to another feature of the invention that monitoring of the sealing joint takes place at a space ahead of the point of separation that exceeds the tubular length required for the predetermined stuffing amount of a sausage, and that the shirring operation is discontinued and the shirred material dividing off and placed ahead of the force-meat ejector of the stuffing machine as soon as the largest possible multiple of the tubular length required for a predetermined stuffing quantity of a sausage in a given tube caliber has been reached prior to entrance of the sealing joint into shirring zone.

Starting from the prior known arrangement according to DE-OS No. 29 41 872, comprising a support for rotatably locating a supply roll of tube material, a means for the section-wise axial shirring of the tube material dispensed from the supply roll, a means for separating off the shirred tubular sections from the unshirred material strip, a means for cyclically transferring the separated-off tubular sections to ahead of the force-meat ejector of a sausage stuffing machine having at least one filling tube receiving a tubular section, a casing brake effective during stuffing for the tube material withdrawn from the stuffing tube, a clip setting means disposed ahead of the stuffing tube end, for dividing off and closing off of the tube material stuffed by the stuffing machine, in portions, with forced meat, and control and locking means for the programmed sequential control of the individual means, an apparatus for carrying out the method of the invention is suitably characterized by a known per se first metering system for measuring the length of each shirred tubular section, a second metering system for continually measuring the length of the tube material withdrawn during stuffing from the stuffing tube through the casing brake, a memory means for storing the measured result of the said first metering system for each shirred tubular section, a comparator means for continually comparing the stored measured result during processing of the measured tubular section with the measured values of the second metering system, and a computer means for continually computing from the comparison the material length on the filling tube remaining available and thereafter activating the control and locking means.

Further features of a preferred embodiment of such an arrangement for carrying out the method of the invention are being set forth in dependent claims 10 to 19.

One example of embodiment of an apparatus for carrying out the method of the invention will now be described in greater detail in conjunction with the drawings.

Figure 1:
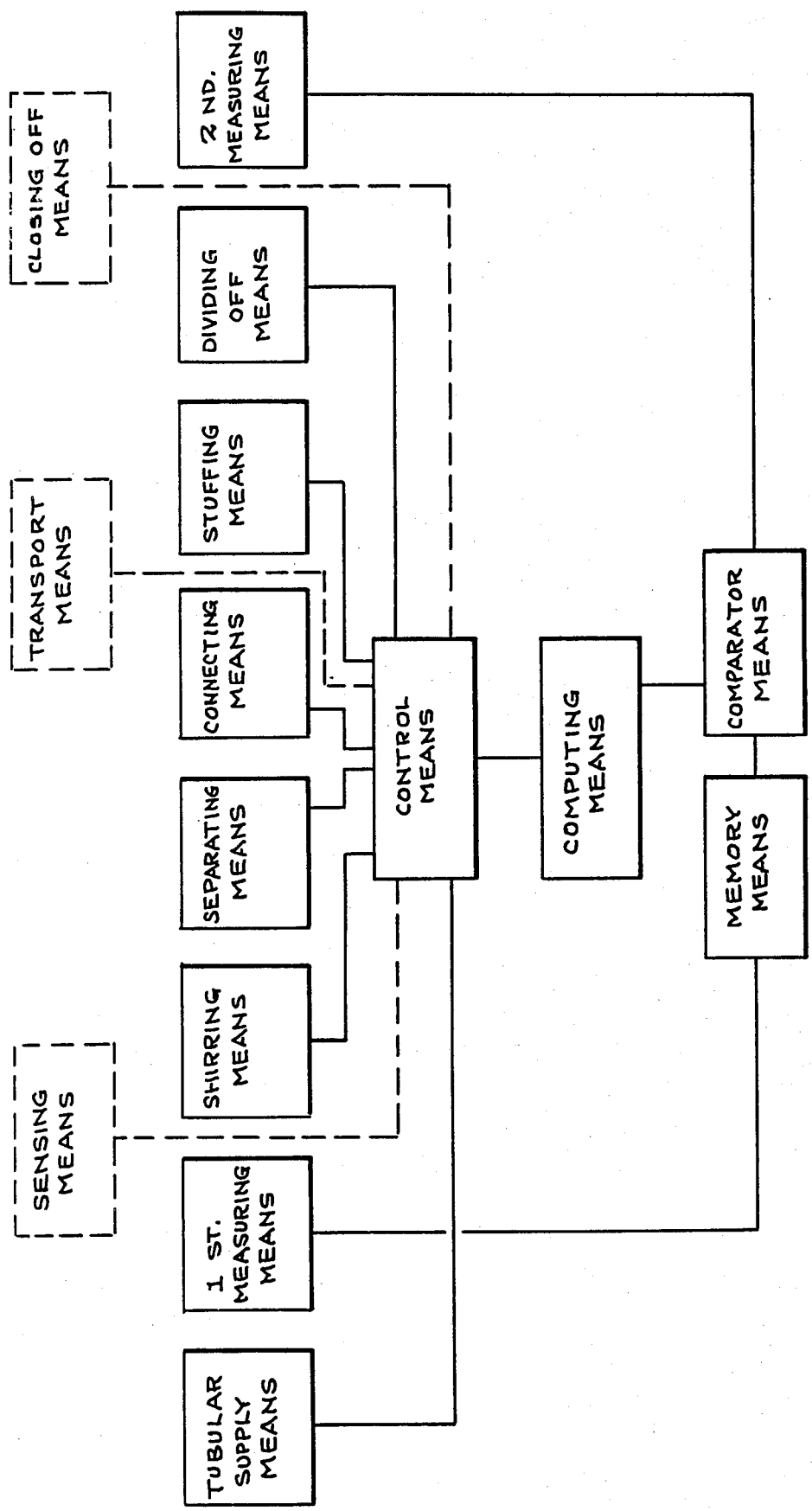
FIG. 1 is a block diagram illustrating the interrelationship of the various elements of the apparatus of the invention.
Figure 2:
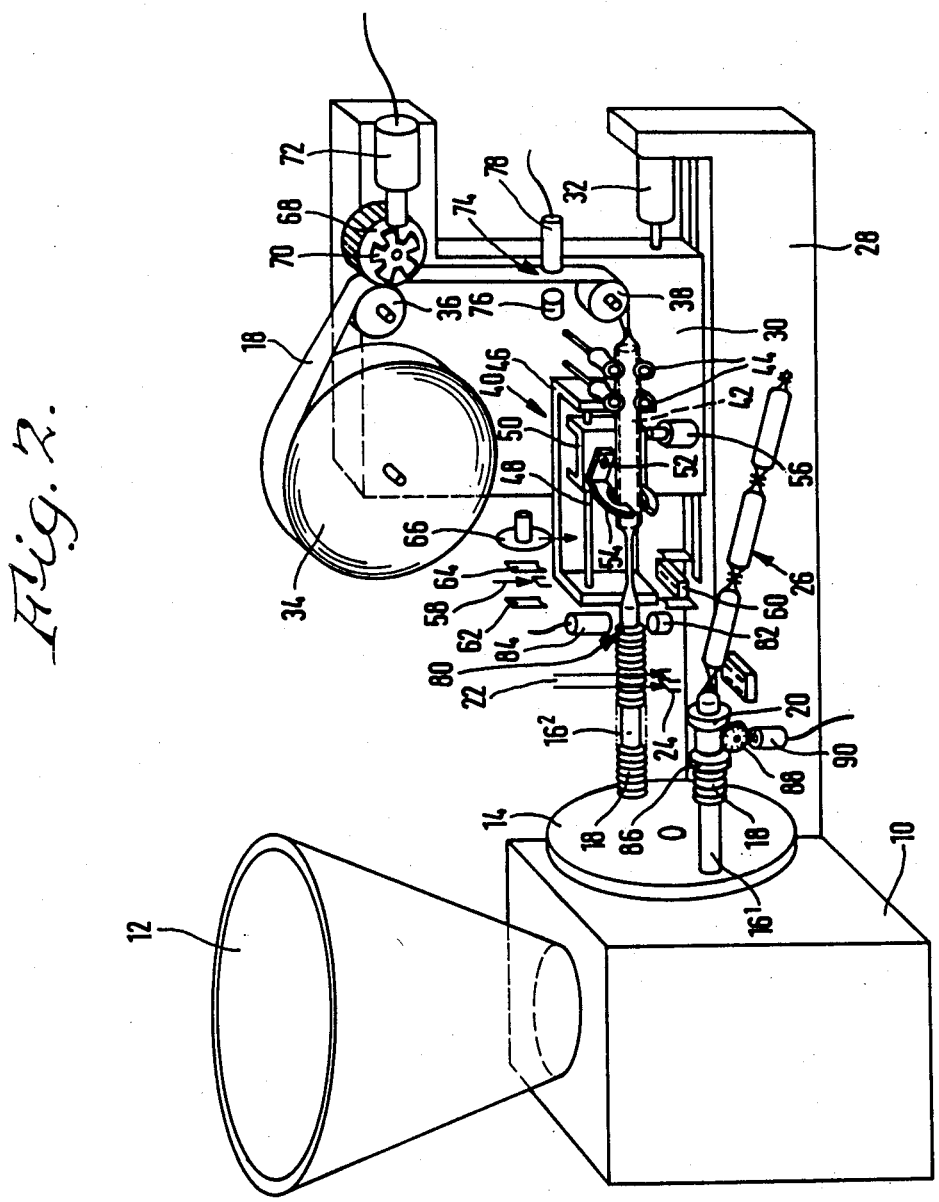
FIG. 2 is an embodiment of the apparatus of the invention.

In the drawings, a sausage stuffing machine is designated by reference numeral 10. A stuffing horn 12 mounted on the machine is used in known manner for filling of the meat masses diminuted in the machine to result in force meat. Provided laterally of machine 10 is a revolver disk 14 having two filling tubes $16^1$, $16^2$ disposed in parallel with respect to one another and being of an identical configuration which filling tube through turning the disk by respectively 180° by means of a switch drive (now shown) alternately can be placed ahead of the non-visible force meat ejector of the stuffing machine 10. In the drawing, the front-sided filling tube $16^1$ is in the "filling position" ahead of the force meat ejector, while the rear filling tube $16^2$ takes the socalled "loading position".

In the loading position, filling tube $16^2$ is loaded in the manner described in the following, with sausage casing in the form of axially shirred artificial casing tubular material 18 into which is loaded in the filling position thereof, the force meat through the filling tube $16^1$ during withdrawal of the tube material thereon. A socalled "casing brake" 20 resiliently overlapping the end of filling tube $16^1$ will retard withdrawal of the tube material thereby safeguarding that the latter is tightly filled with force meat.

Located ahead of the open end of the filling tube $16^1$ is a clip setting mechanism for the pair-wise setting of metallic closing clips 24 as indicated at 22 by means of which the sausage string 26 resulting after stuffing is subdivided into sausages linked together in chain-type manner and is closed off between the sausages. If the tube material on filling tube $16^1$ has been used up, the casing brake is moved into a position releasing the filling tube, and revolver plate 14 is indexed by 180° in order to place the second filling tube $16^2$ "loaded" in the meanwhile ahead of the force meat ejector of the machine. After casing brake 20 having been pushed back onto the end of the filling tube, the filling operation is started anew in prescribed manner until the tube material thereon has equally been used up while the second filling tube in the loading position in the meanwhile has been loaded anew with tube material. The apparatus as described in the following serves to load the filling tube respectively being in the loading position:

On an elongated guide bed 28 coupled to stuffing machine 10, a carriage housing 30 is displaceably guided in parallel to the filling tubes 16 and can be dislodged by a double acting power cylinder hydraulically or pneumatically between an "advanced" position—shown to the left in the drawing—and a "retracted" position—shown to the right in the drawing. Carrier housing 30 in a detachable support carries a supply spool 34 having artificial casing tube material 18 flatly wound thereon which, via pulleys 36,38 is supplied to a shirring means generally designated by 40 in a manner coaxial to filling tube 16 taking the loading position. Associated to the shirring means is a "floating" pipe length 42 being of the same diameter as filling tubes $16^1$, $16^2$ which between two pairs of guide rollers 44 in coaxial alignment is fed to filling tube $16_2$ taking the loading position. Tube material 18 running flatly from supply spool 34 via pulleys 36,38 will be "opened" by pipe length 42 on its circular cross-section and, owing to the free rotatability of guide rollers 44, will be able to pass unimpededly between the latter and pipe length 42.

Shirring means 40 according to the prior state of art (German Patent Application No. P 31 34 698.7-27) comprises a U-shaped support frame 46 secured to carrier housing 30 between the legs of which are disposed two guide rods 48 extending in parallel. On guide rods 48, a U-shaped carrier 50 is displaceably guided in parallel to pipe length 42. Carrier 50 superposes two shafts 52 to which is secured at the front side of the carrier respectively one gripper lever having a semicircular gripper jaw 54. The two gripper jaws 54, hence, form sort of tongs adapted to be opened and closed respectively by twisting the shafts in counterclockwise direction. Carrier 50 is provided with a drive (not shown) for reciprocation on guide rods 48. Moreover, provided on the rear side of carrier 50 is a drive (equally not shown) for the shafts of the gripper jaws by way of which a movement of the gripper jaws can be derived from the carrier movement such that the same will close in the righthand end position of the carrier 50, remain closed during displacement of the carrier to the left, open in the lefthand end position and in opened position retract with the carrier in order to then close anew.

The interior of the gripper jaws 54 is furnished with friction pads adapted to the outer diameter of the piep length 42 so that the gripper jaws 54, in closed condition, will seize, by frictional resistance, the tube material 18 running over pipe length 42, while, in opened condition, they can be freely guided over the tube material.

Moreover, provided on the carrier housing 30 is a clamping mechanism 56 by way of which the tube material 18 can be clamped against the tube length 42 in order to fix the tube material 18 and the pipe length 42 to the carrier housing 30. The clamping means 56 may be a pneumatic or hydraulic power cylinder or an electromagnet the movable element of which carries a friction pad seizing the tube material upon actuation thereof.

The path of displacement of carrier 50 on the guide bed 28 is so dimensioned that pipe length 42, in the advanced position, snugly abuts filling tube 16 taking the loading position, and in the retracted position, is at a larger space of, for example, 100 to 150 mm from the filling tube 16. In that space range, secured to guide bed 28 above or below the path of the pipe length 42, are a clip setting mechanism having a driver 58 indicated only as an arrow, a matrix 60 and two pairs of scissor jaws 62,64 and a separating means, for example, in the form of a rotating drivable cutting blade 66 which, in idle condition, are retracted from the path of the pipe length 42 to such a degree that the carrier housing 30 with the clamped pipe length 42 can unimpededly be moved in reciprocating manner toward the filling tube 16 and the gripper jaws 54 along the pipe length 42 and the filling tube 16.

Moreover, mounted on carrier housing 30, next to pulley 36, is a follower roll 68 applicable by frictional resistance to the tube material guided thereover under spring action, with the said follower roll driving a star wheel 70 for magnetically influencing an electric transducer 72. The pulses generated by transducer 72, hence, are a multiple of the revolutions of the star wheel 70 and permit, by counting, a length measurement of the tube material withdrawn from the supply roll 34 during loading of the filling tube 16.

Moreover, provided on carrier housing 30 between pulleys 36 and 38 is a sealing joint watching mechanism 74 comprising, for example, a light source 76 and a photocell 78 to watch tube material 18 passing therebetween for occurrence of a sealing joint. That mechanism is so designed that photocell 78, normally, is energized by the light of the light cell 76, with the energization being, however, interrupted upon occurrence of a sealing joint.

A similar second sealing joint watching mechanism 80 is provided directly behind the separating means 66 and the scissor jaws 62,64 with the only exception that the illuminating means 82 and the photocell 84 of the said watching mechanism 80 are located on the same side of the tube material and for this the light emitted by the illumination means 82 is reflected by the polished surface of the filling tube 16 toward the photocell 84. As the light in this connection will have to pass twice through the tube material, photocell 84 is adjusted correspondingly more sensitively and the light source 82 is of a more powerful layout, respectively.

As moreover shown in the drawing, another ring-shaped member 86 is provided at a space from the casing brake 20, on the filling tube being in the filling position which, according to the drawing is filling tube $16^1$, with the tube material passing through the said member 86 as it does through the casing brake 20. The ring-shaped member 86 serves as a retaining element for the shirring folds of the tube material located on the filling tube to permit measurement of the withdrawal length ahead of the casing brake 20. That metering is done by means of a follower roll 88 seizing, by frictional resistance, the tube material between the casing brake 20 and the retaining element 86, with the follower roll driving a star wheel not shown in detail for magnetically influencing an electric transducer 90. The pulses generated by transducer 90, again, are a multiple of the revolutions of the follower roll 88 and permit, by count, a length metering of the tube material withdrawn from the filling tube during filling.

For turning on and off sausage stuffing machine 10, for indexing the revolver disk 14, for controlling the driving cylinder of the shirring means 40 and for controlling the clip setting mechanisms 22 and 58 to 64, electrically operable control means (not shown) and blocking means (not shown either) are provided, with the latter seeing to it that the respective actuation can be effected only if the preceding actuating step has been concluded and the apparatus to be actuated is ready for operation.

The entire programme sequence of the arrangemetn as shown is controlled and coordinated by a microcomputer (not shown) which, in usual manner contains a microprocessor and Programmable Read Only Memories (PROM) and Random Access Memories (RAM) in addition to the other usual components of a microcomputer.

Connected to the microcomputer, in addition to the aforementioned control means, are also the two transducers 72 and 90 and the signal receivers of the sealing joint metering mechanisms, as are the two photocells 78 and 84 in the exemplary case.

The way of operation of the apparatus as shown, under the control of the microcomputer, is as follows:

Be it assumed that the revolver disk 14 with an empty guide tube is ahead of the shirring mechanism 40, the carrier housing 30 has taken the end position to the right in the drawing, i.e. power cylinder 32 is retracted, carrier 50 equally has taken its righthand end position and the tube material wound off the supply roll 34 via pulleys 36 and 38 and between guide rolls 44 is drawn onto the pipe length 42, which, in turn, is fixed through the clamping mechanism 56 to the carrier housing 30. Be it assumed, moreover, that provided on the second filling tube located ahead of the force meat ejector of the sausage stuffing machine 10, is a shirred tubular casing section in the form of a tubular corrugation the end of which protruding beyond the filling tube aperture is closed off by means of a closure clip, and that the retaining ring 86 and the casing brake 20 are pushed upon the front end of the said filling tube and the follower roll 88, by frictional resistance, abuts the tube section provided between the retaining element 86 and the casing brake 20.

If, from that starting position, the arrangement is put into operation and the operation thereof is continued, respectively, the microcomputer will first issue the command to the control valve of the power cylinder 32 to displace the carrier housing 30 to the shirring mechanism 40 to the left until pipe length 42 with the front side thereof is in abutment with the rear filling tube. Thereupon, by computer demands, the clamping means 56 is released and the shirring mechanism 40 turned on with the result that the reciprocating and, hence, closing and re-opening gripper jaws 54 withdraw tube material 18 from supply roll 34, pushing it together in circumferential folds, axially, on the rear filling tube.

Simultaneously with the beginning of the shirring operation, a counting mechanism connected to the transducer 72 within the microcomputer will count the counting pulses of the star wheel 70 comparing the meter number computed therefrom of the tube material withdrawn from the supply roll 34 with a programmed desired length for the material to be shirred together on the filling tube to form a corrugation.

When shirring is started on the rear filling tube, stuffing machine 10 is switched on and force meat is stuffed by the portion through the front-sided filling tube into the tube material withdrawn therefrom. Whenever a predetermined filling quality is reached, the stuffing operation will be discontinued and the stuffed sausage string will be divided off by constriction performed by suitable constricting tools and two closure clips 24 will be set whereupon stuffing machine 10 is again turned on. The length of tube material 18 withdrawn from the front-sided filling tube is permanently detected by transducer 90 and compared there with the length metering result previously obtained by transducer 72 for that tube section when it was shirred.

In addition to the continued length measurement of the tube material withdrawn from the front-sided filling tube, the microcomputer in conjunction with either the on-switchings or the stuffing machine 10 or the releasings of the clip setting mechanism 58 to 64 will detect the amount of tube material withdrawn from the front-sided filling tube for respectively one stuffed sausage. Based on that measurement, the microprocessor will constantly compute the still available residual length of tube material on the front filling tube and will see to it, depending on how the microcomputer is programmed, that either the stuffing, dividing off and closing off be discontinued if the tube material left on the front-sided filling tube will no longer be sufficient for another sausage length, or that the stuffing operation be prematurely terminated and the clip setting mechanism 58 to 64 be actuated for the last time. This will avoid "stuffing into vacuity", at the same time optimally exploiting the tube supply provided on the front-sided filling tube.

Upon termination of the shirring operation after shirring of the predetermined tube material legnth and after the clip setting mechanism 22 having for the last time divided off the sausage string and set two closure clips 24 without switching on again stuffing machine 10, clamping mechanism 56 will be actuated, securing pipe length 42 via tube material 18 to the carrier housing. Power cylinder 32 is retracted thereupon, displacing carrier housing 30 to the right so as to provide an adequate free space betwen the rear filling tube $16^2$ and the pipe length 42 to move constricting jaws 62,64 toward one another, set a clip with the aid of the clip setting mechanism 58,60 and to cut the so closed and shirred material section with the aid of a cutting knife 66 off the unshirred material provided on the pipe length 42.

At the same time, casing brake 20 with retaining ring 86 and measuring mechanism 88,90 is moved away from the front—sided filling tube so that the latter is equally free for the subsequent displacement of the filling tubes by turning the revolver disk 14 by 180°. After rotation of the revolver disk the arrangement is again in the above-mentioned starting position in which constricting jaws 62, 64, clip setting mechanism 58,60 and the cutting knife 66 equally have taken their starting positions.

During shirring, the tubular length withdrawn from the supply roll 34 is permanently detected by tranducer 72 and so processed in the microcomputer that upon reaching a fixed multiple of the tube length required for a single sausage stuffing that corresponds to a programmed number of sausages, the shirring operation is discontinued; changes in the said tube lengths required for each sausage, that on the one hand may be due to a different stretchability of the sausage casing material and, on the other hand, may be due to different caliber cross-sections, are permanently detected and utilized by feedback during shirring. As such changes, generally, will not suddenly occur, in this way, a substantially 100% exploitation of the tube material for the manufacture of sausages can be attained.

In the event that during shirring a sealing joint occurs in the tube material string 18 passing between the illumination means 76 and the photocell 78, the microcomputer will receive a signal from the photocell 78 from which to compute how much tube material can still be withdrawn from the shirring means without allowing the sealing joint to pass into the range of the gripper jaw 54, it being possible for the shirring operation to be switched off beforehand if a fixed multiple of the tube length required for a sausage had just been managed to be shirred. Now the shirring operation is terminated, the clamping mechanism 58 actuated, the carrier housing 30 displaced by the power cylinder 32 to the right and the tube material divided off with the aid of the separating mechanism 58. Thereupon—exactly, as is the case in a usual working sequence—on the understanding that the tube material provided on the other filling tube has been used up in the meanwhile and the casing brake 20 with the retaining ring 86 has released the filling tube, the revolver disk 14 is turned by 180° C.

As the shirring operation on account of the sealing joint watching has been discontinued prematurely, the tube material now ahead of the force meat ejector of the stuffing machine 10 will contain only a supply for a smaller number of sausages which, however, is detected in the microcomputer and is not exceeded, owing to the reference measurement, in the subsequent filling operation.

In the meanwhile, the carrier housing 30 with the shirring means moves again toward the empty filling tube, conveying the tube material containing the sealing joint onto the filling tube until photocell 84 has detected that the sealing joint has passed the light beam on the illumination mechanism 82 thus being fully located on the filling tube. Thereupon, after the carrier housing 30 having been retracted, the material supply is again cut off with the aid of cutting knife 66 while the stuffing operation on the filling tube located ahead of the force meat ejector of the stuffing machine is continued.

After the filling operation having been terminated and the casing brake 20 and the retaining ring 86 having released the front filling tube, owing to a special configuration of the switch drive for the revolver disk 14, the latter is first indexed by only 90° and in that position, the tube section containing the sealing joint, with the aid of a stripper (not shown) is stripped off the filling tube. As soon as this has been done, the revolver disk 14 is again actuated thereby placing again an empty filling tube ahead of the shirring mechanism. If new tube material is shirred onto the said tube, the stuffing operation on the other filling tube that is equally empty, will have to be discontinued for one cycle.

The control of the individual operation with the aid of microcomputers is a mere question of programming that can be readily solved by the average ability of the one skilled in the art.

The invention in the afore-going has been described in conjunction with measuring systems in which respectively one transducer 72 and 90, respectively, cooperates with a follower roll 68 and 88, respectively. The accuracy of the length measurements can still be improved if new tube material suggested by the invention, is used that is provided with material discontinuities disposed at regular spaces in the longitudinal direction and, under measurement technological aspects, are detectable during passage. Of simple design, such material discontinuities may be composed of marking points or marking lines printed in a longitudinal row onto the tube material, which are detected by photocells provided in place of follower rolls 68 and 88 and which can be counted by a counting mechanism connected to the respective photocell. The "measuring pole" located on the tube material composed of a graduation with no reference points or length indications, for, it is only the counting of the measurement units that is relevant of the invention, could also be formed by material discontinuities that can be mechanically scanned, such as e.g. minor elevations. In another variant of embodiment, the material discontinuities could be formed by application or inclusion of a material containing a metallic component to or into the tube material so as to permit detection thereof by magnetic or electric sensors. Basically, it is of importance that the markings forming the graduation provided on the tube material, will suit the nature of the sensors as used and can be counted while moved past the sensor. This will permit a contact-free measurement of the tubular section lengths.

It is understood that e.g. also a material characteristic, for example in the form of a paint coat, continuously winding in helical manner about the tube material, can be considered for the measuring purposes as described because the helical curve, viewed in the longitudinal direction, will represent itself as a material discontinuity. The repetitive space thereof can be, for example, one centimeter or several centimeters and, feasibly, at the most, should have a dimension corresponding to the smallest sausage length to be manufactured from the tube material as provided for.

Basically, it is irrelevant at what time the length marking suggested according to the invention is applied to or onto the tube material. If it is likely that the material discontinuities provided on the outer side of the tube material will be damaged thereby interfering with the measurements, it will be possible to provide the impressions or the like markings on the inner side of the tube or in the longitudinal seam of the tube material between the overlapping material layers.

As the metering system operating with a graduation on the tube material, for the length measurement counts the number of the material discontinuities it is irrelevant whether or not the tube material is stretched at the point of measurement. Accordingly, there is greater freedom of choice concerning the location of the sensors for the material discontinuities. It would, for example, be possible for a metering system including a sensor to be located in the withdrawal direction behind casing brake 20.

We claim:

1. In a method for the continuous automated manufacture of sausage wherein tubular material for sausage casings from a supply source, is axially shirred into sections and said sections are stuffed with force meat into divided off portions, the improvement comprising continually measuring the length of tubular material comprising each shirred section before stuffing, continually measuring the length of tubular material from each shirred section utilized during stuffing, continually comparing the length of tubular material utilized during stuffing with the length of shirred material measured before stuffing and dividing off said portions in response to that comparison.

2. A method according to claim 1, wherein the tubular length of material shirred into a section from the supply source is compared with a predetermined section of tubular material which at least approximately corresponds in length to a fixed multiple of the tubular length required for a predetermined divided off portion in a given tube caliber.

3. A method according to claim 2, wherein the stuffing and dividing off of a shirred section is discontinued if the result of the comparison of the tube material utilized during stuffing with the length of the shirred tubular section shows that the residual material available for stuffing is not sufficient for a predetermined portion.

4. A method according to claim 2, wherein the last filled portion in the stuffing operation of each tubular section is increased or reduced in accordance with the residual length of the tube material available for stuffing as determined from the comparison.

5. A method according to claim 2, wherein the section length for shirring is separated off in response to the measurement of the tube length actually required for established quantities of filled portions as a result of caliber and/or elasticity fluctuations of the tube material.

6. A method according to claim 1 wherein the length of the tubular section during withdrawal from the supply source and the length of the shirred tube material utilized during stuffing are measured through identification means on the casing.

7. A method according to claim 1, wherein the length of the tubular sections during withdrawal from the supply source and the length of the shirred tube material utilized during stuffing are measured by counting material discontinuities disposed at predetermined longitudinal spaces on the tube material.

8. A method according to claim 7, wherein measurement is performed in contact-free manner.

9. A method according to claim 1, wherein the tube material withdrawn from the supply source is constantly monitored for the presence of a sealed joint.

10. The method of claim 9 wherein the shirred tubular section is separated off in response to the presence of the sealed joint.

11. A method according to claim 10 wherein the tubular section is separated off before the seal joint is shirred.

12. A method according to claim 10, wherein shirring of the tube material from the supply source is interrupted, the tubular section containing the sealed joint is separated from the supply source and a new shirred section is formed with the tube material following.

13. A method according to claim 12, wherein monitoring of the sealed joint is performed at a distance from and ahead of the separating point, with the distance exceeding the tubular length required for a predetermined filling portion, and that the shirring operation is interrupted and the shirred material separated off as soon as the largest possible multiple of the tubular length required for a predetermined filled portion in a given tube caliber is reached prior to entrance of the sealing joint into the shirring range.

14. The method according to claim 10 wherein the tubular section is separated off such that the sealed joint is contained proximate the first filled end of the shirred section.

15. The method according to claim 6 wherein said identification means is a mechanical means.

16. The method of claim 6 wherein said identification means is an electronic signaling means.

17. The method of claim 6 wherein said identification means is an optical signaling means.

18. An automated apparatus for the manufacture of sausage comprising:
tubular material supply means;
shirring means for axial shirring tubular material obtained from said supply means;
first measuring means for measuring the amount of tubular material being shirred;
separating means for separating an axial shirred tube section from unshirred material obtained from the supply means;
connecting means for connecting said axial shirred tube section to a force meat ejector stuffing means;
force meat ejector stuffing means for stuffing shirred tubular material;
dividing off means disposed proximate the force meat ejector means for dividing off tubular material into portions;
second measuring means for measuring the amount of tubular material being stuffed with force meat;
memory means for receiving and storing the results from said first measuring means;
comparator means for receiving and comparing the stored results of said memory means and the results from said second measuring means;
computer means responsive to comparisons received from said comparator means for computing activation and control; and
control means responsive to said computer means for activaton of said shirring means, separating means, stuffing means, and dividing off means.

19. The apparatus of claim 18 comprising a first transport means to transport said tubular material from said supply means to said shirring means.

20. The apparatus of claim 18 wherein said connecting means further comprises a transport means which transports said shirred tube section to said force meat ejector.

21. The apparatus claim 18 wherein said transport means is a filling tube.

22. The apparatus of claim 18 additionally comprising a separating means proximate the force meat ejector for separating stuffed tubular material.

23. The apparatus of claim 18 wherein said memory means, comparator means and means responsive to said comparator means comprise a computer means.

24. The apparatus of claim 18 additionally comprising a casing brake means for controlling the playout of casing during stuffing.

25. An apparatus according to claim 23, wherein the computer is programmable to the number of portions to be filled with predetermined quantities of force meat, and the length of shirred tubular sections is determined from the measured results of the second measuring means compared to results of the first measuring means.

26. An apparatus according to claim 18, wherein the first and second measuring means include transducers for converting the measured material lengths into counting pulses.

27. An apparatus according to claim 26, wherein the two transducers are provided with follower rollers for driving, by frictional resistance, the tubular material.

28. An apparatus according to claim 18, wherein at least one of the first or second measuring means includes a sensor detecting material discontinuities and a counting means counting the discontinuities.

29. An apparatus according to claim 28, wherein the sensor is held at an intermediate space from the tube material.

30. An apparatus according to claim 28, wherein the sensor is a photocell responding to predetermined optically effective material discontinuities.

31. An apparatus according to claim 18, wherein the comparator and the memory means are components of a microcomputer.

32. An apparatus according to claim 18, wherein the second means for measuring is located between a casing brake and a retaining element spaced therefrom for retaining the shirring folds of the tube material.

33. An apparatus according to claim 32, wherein during placement of a new shirred tube material section ahead of the force meat ejector, the retaining element and the said measuring means, along with the casing brake, are temporarily removable from a filling tube.

34. An apparatus according to claim 22, comprising two sealing joint monitoring means, one of which is located ahead of and the other one being located directly behind the separating means, providing results to said computer.

35. An apparatus according to claim 34, wherein the first sealing joint monitoring means is disposed in spaced relationship ahead of the separating means, with the space exceeding the largest portion length that can be manufactured by the apparatus.

36. An apparatus according to claim 34, wherein a sealing joint monitoring means is a photoelectric monitoring means.

37. An apparatus according to claim 34, wherein a sealing joint monitoring means is a capacitive metering means.

38. The method of claim 1 wherein said divided off portions are closed off.

39. The apparatus of claim 18 including a closing off means disposed proximate the force meat ejector means for closing off tubular material into portions.

40. The apparatus of claim 39 wherein said dividing off and closing off means comprise a constricting means for constricting the tubular material, clip setting means for setting a closure clip on the constricted tubular material and cutting means for severing the constricted tubular material.

41. The apparatus of claim 18 including a closing off means proximate the shirring means for closing off the axial shirred tube section.

* * * * *